G. J. Bitler.
Grain Drill
Nº 14,707.  Patented Apr. 22, 1856.

UNITED STATES PATENT OFFICE.

GEO. I. BITLER, OF LANCASTER, OHIO.

IMPROVEMENT IN SEEDING-MACHINES.

Specification forming part of Letters Patent No. 14,707, dated April 22, 1856.

*To all whom it may concern:*

Be it known that I, GEORGE I. BITLER, of Lancaster, in the county of Fairfield and State of Ohio, have invented a new and Improved Seeding-Machine; and I do hereby declare that the following is a full, clear, and exact description of the same, reference being had to the annexed drawings, making a part of this specification, in which—

Figure 1:
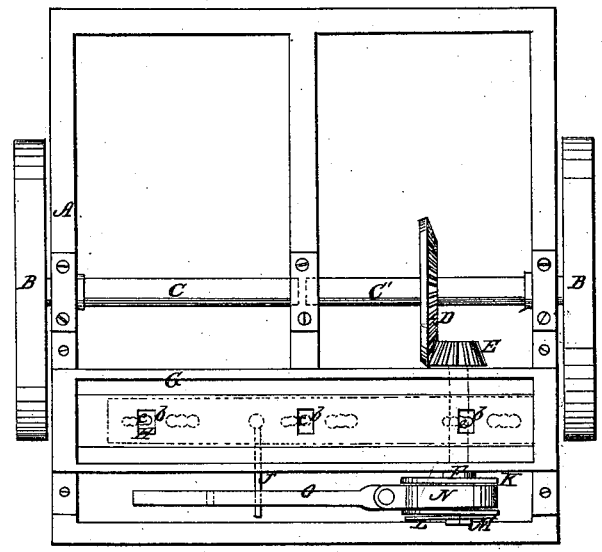
Figure 2:
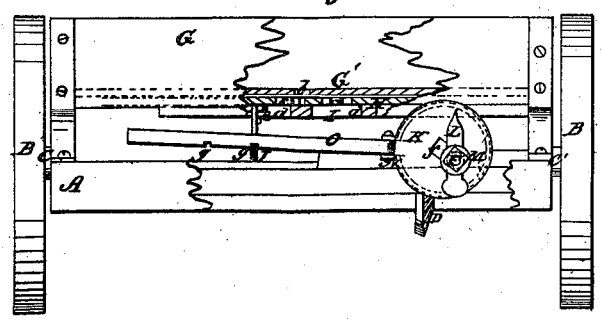

Figure 1 is a plan or top view of my improvement. Fig. 2 is a back view of the same.

Similar letters of reference indicate corresponding parts in the two figures.

To enable others skilled in the art to make and use my invention, I will proceed to describe its construction and operation.

A represents a rectangular frame, which is supported by two wheels, B B, which are attached to separate axles C C', as shown in Fig. 1. On one of the axles, C', there is placed a bevel-wheel, D, which gears into a bevel-pinion, E, on the inner end of a shaft, F, which works in proper bearings on the frame A.

G represents a hopper, which is placed transversely on the frame A, and has rectangular apertures $b$ made through its adjustable bottom G'. The front and back sides of the hopper extend a short distance below the bottom, and have grooves cut in them, in which the edges of a slide, H, are fitted, said slide being perforated with holes $c$, the edges of which are rounded or beveled, so as to allow the seed to pass freely into them and through them.

There are two or more sets of holes made through the slide H, either set being used or made to vibrate underneath the apertures $b$, according to the quantity of seed to be sown on a given area of ground, the different sets of holes varying in size.

To the bottom of the hopper G there is secured a plate, I, which has square apertures $d$ made through it at proper distances apart. (See Fig. 2.) This plate 1 may be secured to the under side of the hopper at different points, so that the apertures $d$ may be placed in a proper relative position with the apertures $b$ in the bottom of the hopper, and thereby regulate the discharge of the seed therefrom.

To the under side of the slide H there is attached an arm, J, by a screw, $e$, so that said arm may be adjusted or secured at different points to the slide. The outer end of the arm is forked, and projects a short distance beyond the back side of the hopper.

The outer end of the shaft F has a pulley, K, fitted upon it, said pulley having a slot, $f$, cut through it radially from its center toward its periphery, and the end of the shaft F fits in this slot $f$. The outer end of the shaft F has an index, L, and nut M upon it. (Shown clearly in Fig. 2.)

The pulley K has a strap, N, fitted around it, to which strap a pitman, O, is attached. This pitman has notches $g$ cut in its under side, near its outer end, in which notches (either of them) the end of the arm J fits.

The pulley K may be fitted more or less eccentrically on the shaft F, so as to give a greater or less length of stroke to the slide H, and consequently the amount of seed to be sown on a given area of ground may be regulated by adjusting the pulley. The index L will serve as a guide for regulating the pulley. The discharge of seed from the hopper may also be regulated by adjusting the slide H—that is, by attaching the arm J to it at a certain point—so that the proper-sized apertures or holes $b$ in the slide may work under the apertures or holes $b$ in the hopper, and by adjusting the plate I so that its apertures $d$ will be in a proper relative position with the apertures $c$ $b$. The shaft F and pulley K are of course rotated by the bevel-gearing D E.

The sides of all the apertures may be rounded, so as to allow the seed to pass freely through them without being injured or bruised.

I do not claim a perforated reciprocating slide, H, for it has been previously used; but

What I claim as new, and desire to secure by Letters Patent, is—

The reciprocating slide H, having different-sized holes $c$ made through it, in combination with adjustable bottom G' and adjustable plate I, said slide H being also arranged in combination with and operated by the pulley K, substantially as shown, for the purpose specified.

GEORGE I. BITLER.

Witnesses:
GEO. SANDERSON,
SAMUEL I. CLAYTON.